United States Patent [19]

Sensen et al.

[11] Patent Number: 5,258,148
[45] Date of Patent: Nov. 2, 1993

[54] PROCESS FOR CONTROLLING THE DEGREE OF ORIENTATION OF TUBULAR FILMS

[75] Inventors: Klemens Sensen; Klaus-Peter Voss; Werner Feistkorn; Hans-Udo Beckmann, all of Lengerich, Fed. Rep. of Germany

[73] Assignee: Windmöller & Hölscher, Lengerich/Westf., Fed. Rep. of Germany

[21] Appl. No.: 891,054

[22] Filed: Jun. 1, 1992

[30] Foreign Application Priority Data

Jun. 3, 1991 [DE] Fed. Rep. of Germany ....... 4118122

[51] Int. Cl.⁵ .............................................. B29C 47/92
[52] U.S. Cl. ................................. 264/40.2; 264/40.3; 264/40.5; 264/40.6; 264/40.7; 264/564; 425/140; 425/326.1
[58] Field of Search .............................. 264/40.1–40.3, 264/40.5–40.7, 564–566, 569; 425/72.1, 326.1, 140–141, 143, 174.4, 174.2

[56] References Cited

U.S. PATENT DOCUMENTS

| 4,036,557 | 7/1977 | Christensen . | |
|---|---|---|---|
| 4,189,288 | 2/1980 | Halter | 264/40.3 |
| 4,201,741 | 5/1985 | Pannenbecker | 264/40.3 |
| 4,246,212 | 1/1981 | Upmeier et al. | 425/140 |
| 4,402,656 | 9/1983 | Schott, Jr. | 264/40.2 |
| 4,511,530 | 4/1985 | Olsson et al. | 425/326.1 |
| 4,663,097 | 5/1987 | Hatfield | 264/40.1 |
| 4,684,487 | 8/1987 | Gawrisch | 264/40.2 |
| 5,096,634 | 3/1992 | Tsadares et al. | 264/40.7 |

FOREIGN PATENT DOCUMENTS

| 0171963 | 2/1986 | European Pat. Off. . | |
|---|---|---|---|
| 3245605 | 6/1984 | Fed. Rep. of Germany . | |
| 882764 | 11/1981 | Japan | 425/140 |
| 57-29438 | 2/1982 | Japan | 264/40.1 |
| 58-78725 | 5/1983 | Japan | 425/140 |
| 2109591 | 6/1983 | United Kingdom . | |

Primary Examiner—Jeffery Thurlow
Attorney, Agent, or Firm—Keck, Mahin & Cate

[57] ABSTRACT

To determine and/or automatically control the degree of orientation of tubular films which have been made in a film-blowing plant including an extruder having a film-blowing head and apparatus for internal cooling and also including flattening and take-off apparatus, the rate of exchange of the air for internal cooling, the speed of the extruder, the temperature of the plastic composition being extruded and/or the take-off velocity are controlled. To ensure that the degree of orientation can be determined and/or automatically controlled in a simple manner and without an occurrence of trouble, that shape of the flaring portion of the bubble which corresponds to the desired degree of orientation is determined and/or adjusted and is recorded as the desired shape of the bubble. The actual shape of the flaring portion of the bubble is detected and compared with and adapted to the desired shape.

3 Claims, 4 Drawing Sheets

PROCESS FOR CONTROLLING THE DEGREE OF ORIENTATION OF TUBULAR FILMS

BACKGROUND OF THE INVENTION

1. Field of the Invention

This invention relates to a process of determining and/or automatically controlling the degree of orientation of tubular films made in film-blowing plants comprising an extruder having a film-blowing head and means for internally cooling, flattening and taking off the tubular film as well as means for controlling the rate of exchange of the air for internal cooling, the speed of the extruder, the temperature of the extruded plastic being extruded and/or the take-off velocity.

2. Description of the Prior Art

Between the annular die of the film-blowing head and the so-called frost line, which is usually closely spaced below the calibrating basket that confines the inflated film bubble, the extruded molten tubular film is inflated to form a film bubble, which above the frost line has the diameter of the tubular film to be made. The film bubble is inflated by means of cooling air, which is supplied and withdrawn in lines extending through the film-blowing head. The rates at which the cooling air is supplied and withdrawn, i.e., the rate at which said air is exchanged, and the cooling rate as well as the pressure in the bubble can be controlled. The plastic tubing extruded through the film-blowing head initially preserves its as-extruded diameter and is subsequently inflated in the shape of a tapered champagne glass to form the film bubble having the desired final diameter. The stretching of the film bubble is virtually terminated at the frost line, at which the resulting elongation is virtually "frozen". Particularly in its flaring portion having the shape of a tapered champagne glass the film is stretched in its peripheral or transverse direction and in its longitudinal direction so that the plastic molecules are correspondingly oriented. Whereas the inflation of the extruded tubular film to form the film bubble results in a transverse and longitudinal stretching of the tubular film, an additional longitudinal stretching can be effected by a suitable control of the take-off velocity.

The quality and the strength properties of the tubular film which is made will essentially depend on the longitudinal and transverse stretching effected during the cooling phase, i.e., in the region in which the tubular film flares as it is inflated. That result will depend not only on the extent of the longitudinal and transverse stretching but particularly also on the ratio of the velocities of the stretching in the longitudinal and transverse directions; that ratio is described as the degree of orientation.

The ratio of the stretching in the longitudinal and transverse directions, the degree of orientation and the diameter of the tubular film which is made will be influenced by the position of the so-called frost line. The elevation of the frost line may be influenced by various processing parameters, such as the temperature of the plastic composition, the speed of the extruder, the rate of exchange of the cooling air, the temperature of the cooling air, and the take-off velocity. The position of the frost line may even change as a result of a change of the room temperature. On principle, the frost line should be closely spaced below the calibrating basket.

It is known to automatically control the diameter and the stretch ratio of the tubular film by a control or automatic control of the elevation of the frost line relative to the film-blowing head and/or to the calibrating basket.

In most film-blowing plants the position of the frost line is only visually monitored by the operators. In dependence on the experience of the operators the elevation of the calibrating basket, the rates at which the air for internal cooling is supplied and withdrawn and/or the production rate of the extruder are adjusted in dependence on the detected elevation of the frost line. But such adjustments may involve considerable errors because they depend on the skill and experience of the operators.

German Patent Specifications 27 21 609 and 28 31 212 disclose the automatic control of film-blowing plants by methods in which particularly for maintaining a constant predetermined width of the film the position of the frost line is measured and final control elements for influencing the thickness of the film and/or the diameter of the tubular film are controlled in dependence on the deviations which have been detected. But said known methods involve a problem relating to the devices and sensors for detecting the frost line.

It is known to detect the frost line by means of temperature sensors for detecting the temperature of the film by a measurement of the infrared radiation in regions below and above the frost line. But such sensors are highly susceptible to being soiled and this may give rise to trouble in the operation. Finally, temperature sensors cannot be used to detect the temperature of very thin transparent films.

In other known methods the position of the frost line is computed from the energy balance in consideration of the feed rate of the raw material, the production rate, the width and thickness of the film, the temperatures of the cooling air and other controlling parameters. But such methods are not accurate because they depend on properties of the raw materials and the corresponding data are often unknown and can be estimated only with difficulty. Besides, it is difficult to take the influence of the film coefficient of heat transfer between the air and the film into account. For this reason a computation which is sufficiently accurate for practical use is not possible.

SUMMARY OF THE INVENTION

It is an object of the invention to provide a process which is of the kind described first hereinbefore and can be carried out in practice in a simple manner and without an occurrence of trouble and will produce good results.

In a process of the kind described first hereinbefore that object is accomplished in accordance with the invention in that the shape of the flaring portion of the bubble corresponding to the desired degree of orientation is detected and/or adjusted and said shape is stored as a desired shape and the actual shape of the flaring portion of the bubble is detected and compared with the desired shape and is adapted to the desired shape.

The invention is primarily based on the recognition that a certain shape of the flaring portion of the bubble will correspond to a certain ratio of the velocities of the stretching of the tubular film in the longitudinal and transverse directions, which ratio determines the degree of orientation. The shape of the flaring portion of the bubble determines the velocity profile of the stretching of the film in the longitudinal and transverse directions in that portion. The desired quality of the film will be determined by a desired degree of orientation, which can be achieved in that the flaring portion of the bubble is controlled to have a certain shape, which can previously be empirically determined and recorded. If a certain shape of the flaring portion of the bubble is maintained throughout the production of the blown film, it can be assumed that the films which are made have a constant quality and strength, i.e., a constant degree of orientation.

In the method in accordance with the invention the degree of orientation of the film being made is determined empirically or in a laboratory test and the shape of the flaring portion of the bubble which corresponds to that degree of orientation is recorded as a desired shape. For this reason deviations can be detected by a simple comparison of the actual shape of the bubble with its desired shape, which has previously been determined and recorded, and such deviations can be avoided in that the actual shape of the bubble is continually adapted to its desired shape. This can be effected manually or by an automatic control.

The method in accordance with the invention can be carried out, e.g., in that the desired shape of the bubble is photographically recorded and the actual shape of the bubble is compared with and adapted to that desired shape.

The bubble shapes can be compared in a simple manner in that the desired shape of the bubble is recorded and is represented by a video monitor and the actual shape of the bubble is detected and is displayed on a second monitor or on the first-mentioned monitor together with the display of the desired shape. If the desired and actual shapes of the bubble are displayed by one and the same monitor, the control can simply reside in that both displays are caused to agree. The parameters for influencing the actual shape of the bubble can be selected to permit the most convenient adjustment.

A further recognition according to the invention resides in that the shape of the flaring portion of the bubble can be determined substantially only by the position of the point of inflection of the sinusoidal shape of the flaring portion of the film. The bubble may be assumed to have a predetermined shape when the point of inflection lies at a predetermined location. For this reason the process in accordance with the invention can be carried out very conveniently in that the actual shape of the bubble is detected continuously or intermittently and as well as the desired shape is digitalized and the digitalized data are compared in a computer. In dependence on the detected deviations the final control elements for influencing the shape of the bubble can be controlled.

Alternatively, the object set forth can be accomplished in accordance with the invention in that the velocities of the stretching of the film in the longitudinal and transverse directions in the flaring portion of the bubble are measured and the ratio of said velocities is controlled to correspond to a predetermined desired value. In that embodiment of the process in accordance with the invention the degree of orientation is determined by measurement and the adjusted degree of orientation will determine the corresponding shape of the bubble. Films having predetermined special qualities and strength properties will be made if a predetermined degree of orientation is maintained.

According to a further feature of the invention the velocities of the stretching of the extruded tubular film in the longitudinal and transverse directions and/or the ratio of said velocities are or is measured with a laser Doppler velociometer (LDV). Such laser Doppler velociometers are manufactured and sold, e.g., by Polytec GmbH in D-7517 Waldbronn, Germany. In such laser Doppler velociometers the laser light is split to form two beams having equal intensities. The two laser beams are caused by a lens to intersect in the measuring volume of the LDV so that they produce there a striated pattern, which is due to the constructive and destructive interferences of the coherent beams. A particle moving through that measuring volume will result in the generation of a scattered-light signal (Doppler burst) at a frequency which is proportional to the velocity of the particle. As a result the LDV is used for an absolute measurement, which is independent of environmental and other influences. For this reason the LDV is particularly suitable for a measurement of velocities on moving surfaces of extruded tubular films. Fiber-optical LDV systems for a simultaneous measurement of two velocity components are also available and in the process in accordance with the invention can be used to measure the velocities of the stretching of the extruded tubular film in the longitudinal and transverse directions.

It has been stated hereinbefore that the current shape of the bubble can be determined also by a detection of the elevation of the frost line. According to a further concept the object set forth is accomplished in accordance with the invention in that the elevation of the so-called frost line is detected by a laser Doppler velociometer. That measurement can be carried out by the LDV in a non-contacting manner. To detect the frost line it is merely necessary to impart to the LDV a cyclic up and down motion adjacent to the frost line in order to detect the line at which the velocity of the stretching of the film in the take-off direction no longer changes. That line will then define the frost line, the position of which can be used for the control of the elevation of the basket or of other parameters.

DETAILED DESCRIPTION OF THE PREFERRED EMBODIMENT

Figure 1:
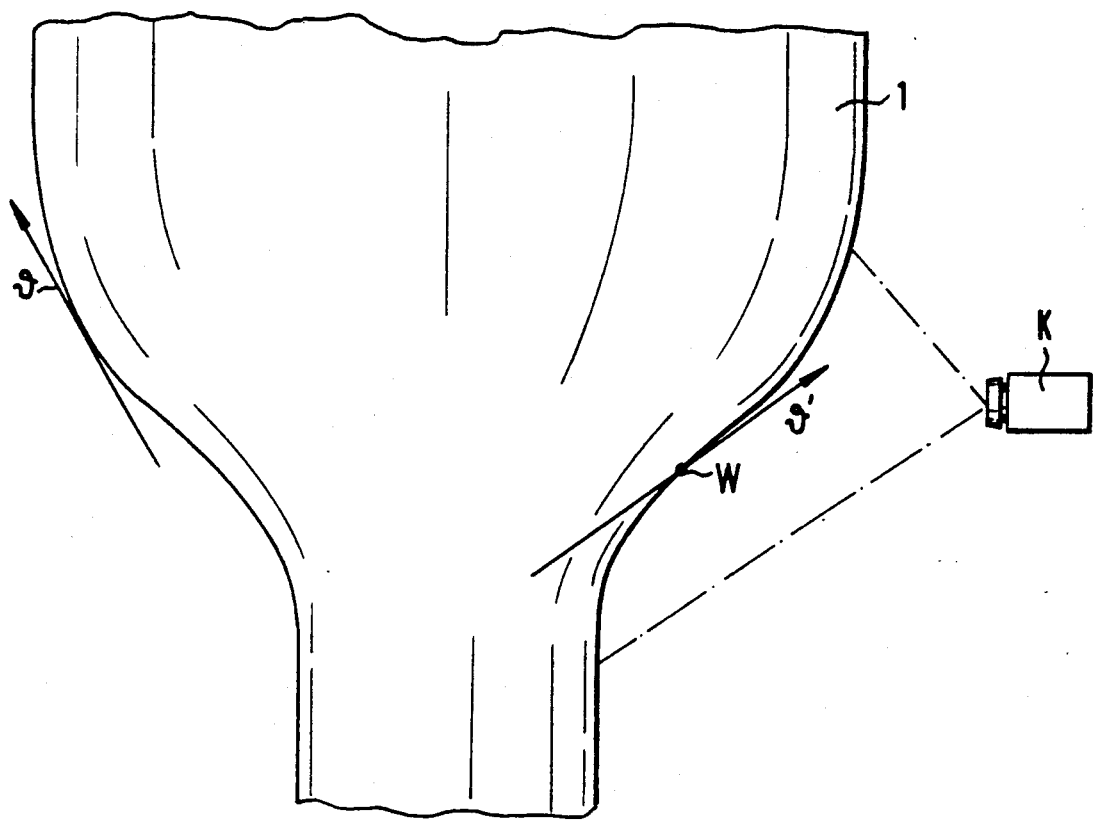
FIG. 1 is a fragmentary view showing a portion of an extruded tubular film and a camera for monitoring the flaring portion of the film.

Illustrative embodiments of the invention will be explained more in detail hereinafter with reference to the drawing.

FIG. 1 shows the flaring portion of an extruded tubular film 1. That flaring portion has the shape of a tapering champagne glass. In that flaring portion the tubular film 1 is stretched at different velocities in the longitudinal and transverse directions. In the embodiment shown in FIG. 1 the flaring portion of the tubular film is monitored by a camera K, such as a television camera. The image of the flaring portion which is being monitored by the camera K is compared with a recorded image of the desired shape of the flaring portion. Suitable parameters of the process by which the tubular film is made are changed in response to a deviation of the detected actual shape of the flaring portion from the desired shape so that the actual shape of the flaring portion will agree with the predetermined desired shape.

Because the actual shape of the flaring portion of the bubble will be determined by the position of the point of inflection W, that position may be optically detected and digitalized and be compared with a stored value, which represents the desired position of the point of inflection.

Figure 2:
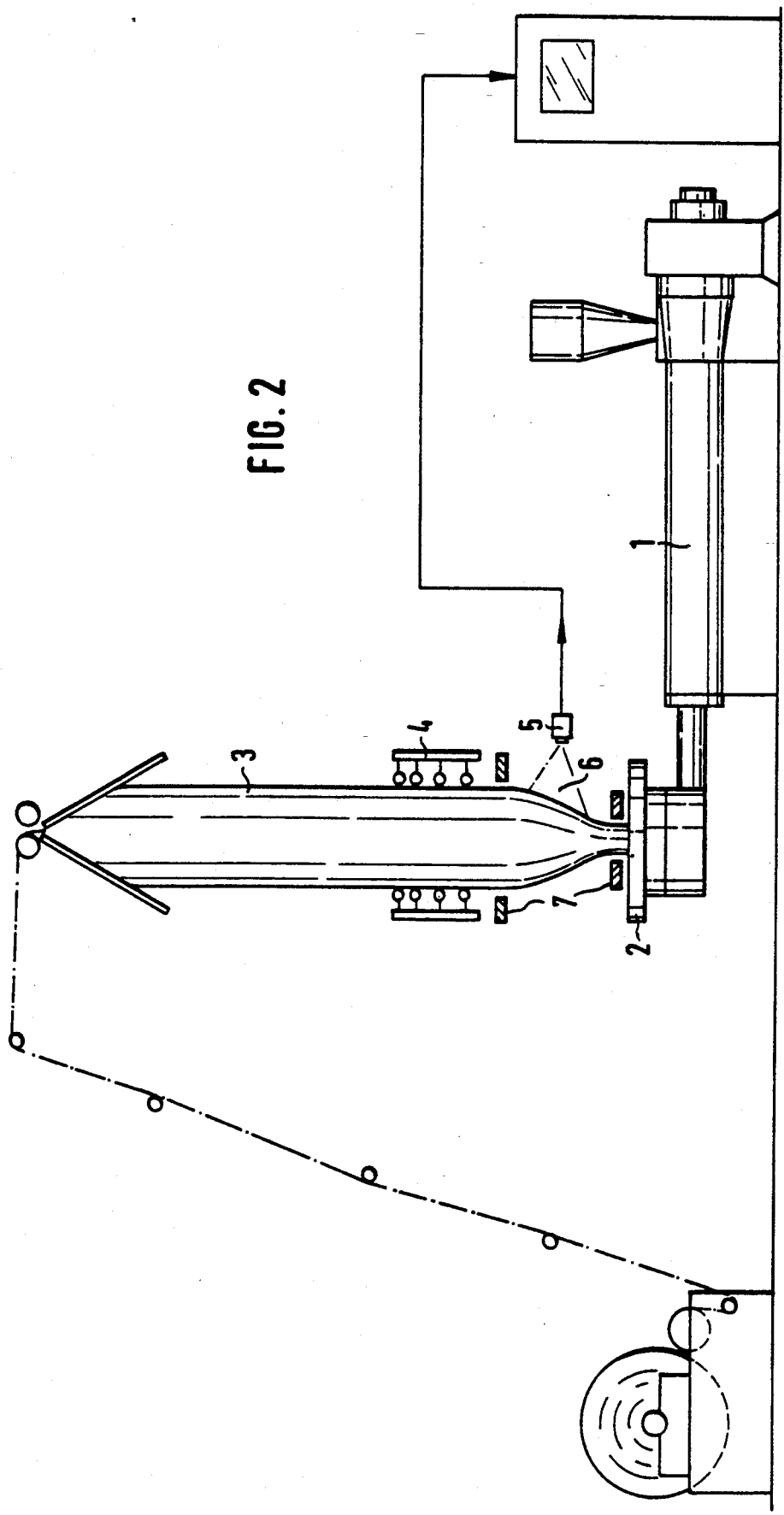
FIG. 2 is a schematic representation of a film-blowing plant, which comprises an extruder, flattening means and a take-off device. In that plant the degree of orientation in the flaring portion of the tubular film is detected by a laser Doppler velociometer.

In the embodiment shown in FIG. 2, the velocity profile in the flaring portion of the tubular film is detected by a laser Doppler velociometer (LDV) 5. The film-blowing plant schematically shown in FIG. 2 is basically of conventional type. The lines which extend through the film-blowing head 2 and serve to supply and withdraw the cooling air and which control also the rate of flow of cooling air and the pressure in the film bubble are not shown. The extruder 1 and the film-blowing head 2 are of conventional type. The calibrating basket 4 is mounted on a frame, not shown, and by means which are not shown can be adjusted in height. The sensing head 5 of the LDV detects the flaring portion of the film bubble 3 in a sensing field 6, which is defined by guiding elements 7, which serve to still the air and the bubble.

Figure 3:
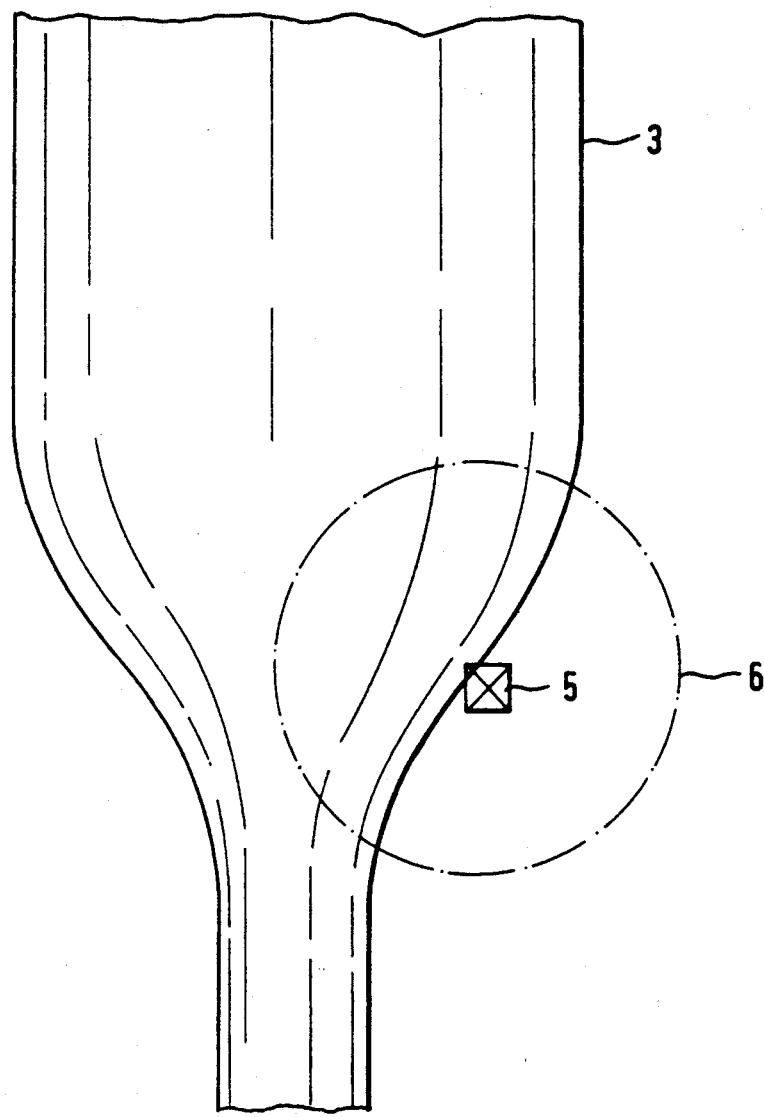
FIG. 3 shows a portion of an extruded tubular film and a laser Doppler velociometer for detecting the velocity profile.

As is apparent from FIG. 3 the flaring portion 6 of the film bubble 3 is tangentially scanned by the laser sensing head 5.

Figure 4:
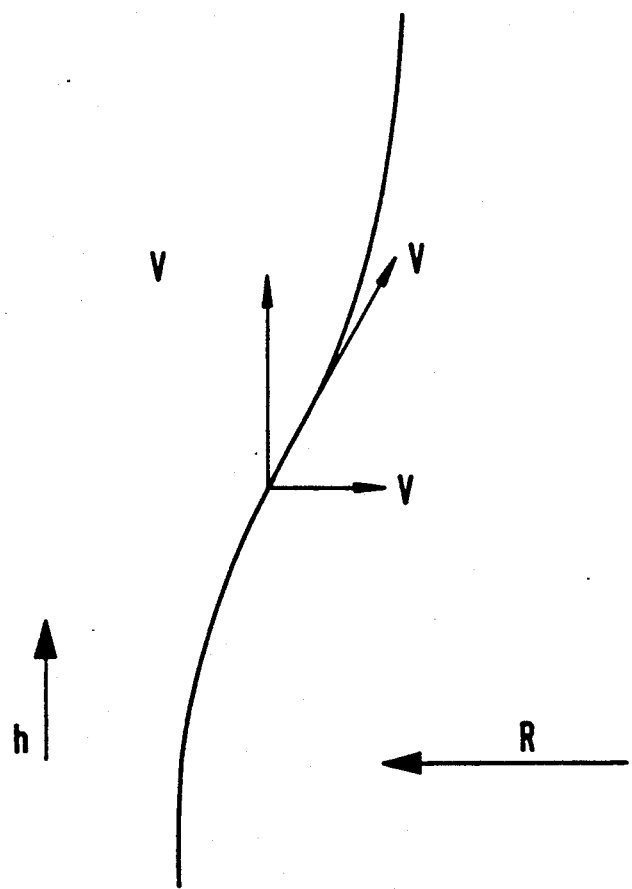
FIG. 4 is a graph illustrating the velocities of the stretching of the flaring portion of the tubular film in the longitudinal and transverse directions.

As is apparent from FIG. 4 the LDV detects the magnitudes and directions of the velocity "V longitudinal" in the longitudinal direction and of the velocity "V transverse" in the transverse direction and also indicates the direction and magnitude of the resultant velocity "V result".

What is claimed is:

1. A process of determining and/or automatically controlling the degree of orientation of the tubular film made in film-blowing plants comprising an extruder having a film-blowing head and means for internally cooling, flattening and taking off the tubular film as well as means for controlling the rate of exchange of the air for internal cooling, the speed of the extruder, the temperature of the extruded plastic composition and/or the take-off velocity, wherein:

the shape of the flaring portion of the bubble corresponding to the desired degree of orientation is detected and/or adjusted and said shape is stored as a desired shape, and the actual shape of the flaring portion of the bubble is detected and compared with the desired shape and is adapted to the desired shape;

wherein the velocities of the stretching of the film in the longitudinal and transverse directions in the flaring portion of the bubble are measured by a laser Doppler velociometer and the ratio of said velocities is controlled to correspond to a predetermined desired value.

2. A process according to claim 1, wherein the elevation of a frost line is detected by a laser Doppler velociometer.

3. A process according to claim 2, wherein the detected elevation of the frost line is compared with a predetermined desired elevation and is automatically controlled to agree with that desired elevation.

* * * * *

UNITED STATES PATENT AND TRADEMARK OFFICE
CERTIFICATE OF CORRECTION

PATENT NO. : 5,258,148
DATED : November 2, 1993
INVENTOR(S) : Klemens SENSEN et al.

It is certified that error appears in the above-identified patent and that said Letters Patent is hereby corrected as shown below:

On the title page, item [75], delete in its entirety, and insert --Klemens Sensen, Lengerich; Klaus-Peter Voss, Lengerich; Werner Feistkorn, Saerbeck; Hans-Udo Beckmann, Lengerich; all of Fed. Rep. of Germany--

Signed and Sealed this

Twenty-sixth Day of April, 1994

*Attest:*

BRUCE LEHMAN

*Attesting Officer*  Commissioner of Patents and Trademarks